(12) United States Patent
Kitch

(10) Patent No.: US 6,895,898 B1
(45) Date of Patent: May 24, 2005

(54) PREFABRICATED PET HOUSE AND METHOD FOR THE ASSEMBLY THEREOF

(76) Inventor: Gerald C. Kitch, 144 Marlborough Rd., Asheville, NC (US) 28804

( * ) Notice: Subject to any disclaimer, the term of this patent is extended or adjusted under 35 U.S.C. 154(b) by 24 days.

(21) Appl. No.: 10/761,172

(22) Filed: Jan. 20, 2004

Related U.S. Application Data

(60) Provisional application No. 60/441,819, filed on Jan. 21, 2003.

(51) Int. Cl.[7] ............................. A02K 1/01; A02K 1/00; B65D 5/00
(52) U.S. Cl. ................... 119/474; 119/416; 119/482; 119/513; 119/491; 119/461; 119/431; 119/498; 229/103.2; 229/115; 229/108; 220/6; 206/822; D30/114; D30/118; D30/117; D30/112; D30/108; D30/120
(58) Field of Search ..................... 229/115, 108, 103.2; 119/472–474, 416, 431, 436, 461, 482, 706, 119/491, 496, 498, 504, 513, 514; D30/114, D30/118, 108, 117, 112, 120; 220/6; 206/822

(56) References Cited

U.S. PATENT DOCUMENTS

| | | | | |
|---|---|---|---|---|
| 1,889,985 A | * | 12/1932 | Hays | 229/115 |
| 2,364,836 A | * | 12/1944 | Whitehead | 119/461 |
| 3,184,145 A | * | 5/1965 | Baker | 229/102 |
| D224,684 S | * | 8/1972 | Hoff | D30/108 |
| 3,891,136 A | * | 6/1975 | Woeste | 229/115 |
| 4,295,446 A | | 10/1981 | Voss | |
| 4,391,223 A | * | 7/1983 | Holland et al. | 119/499 |
| 4,607,784 A | * | 8/1986 | Calabrese | 229/115 |
| 4,792,082 A | * | 12/1988 | Williamson | 229/103 |
| 4,803,952 A | * | 2/1989 | Houser | 119/499 |
| 4,903,637 A | | 2/1990 | Devault | |
| 5,184,436 A | * | 2/1993 | Sadler | 52/79.1 |
| 5,383,422 A | | 1/1995 | Morris | |
| 5,465,686 A | | 11/1995 | Monetti et al. | |
| 5,515,811 A | | 5/1996 | McAlister | |
| 5,738,477 A | * | 4/1998 | McCorkle et al. | 411/509 |
| 5,950,568 A | | 9/1999 | Axelrod et al. | |
| 5,979,366 A | | 11/1999 | Cook | |
| 6,631,590 B1 | | 10/2003 | Glowaski | |
| 6,662,947 B2 | * | 12/2003 | Lopez | 206/427 |
| 2004/0084513 A1 | * | 5/2004 | Testerman et al. | 229/115 |

FOREIGN PATENT DOCUMENTS

FR           2618050 A1 *  1/1989

* cited by examiner

Primary Examiner—Peter M. Poon
Assistant Examiner—Andrea M. Valenti
(74) Attorney, Agent, or Firm—Carter, Schnedler & Monteith

(57) ABSTRACT

A pet house substantially formed from a unitary blank of material, foldable from a collapsed state for shipping and storage to an erect state for use. The house includes a bottom having four edges. The house also includes first and second side walls and first and second end walls. The side walls are attached to one another forming an apex at the top of the house. One end wall includes an opening to permit the pet to ingress and egress the house. The bottom includes a slot near one edge for receiving a locking tab which extends from one of the side walls. Fasteners are provided for attaching the first and second end walls to the first and second side walls.

6 Claims, 5 Drawing Sheets

PREFABRICATED PET HOUSE AND METHOD FOR THE ASSEMBLY THEREOF

This is a U.S. non-provisional application relating to and claiming the benefit of U.S. Provisional Patent Application Ser. No. 60/441,819, filed Jan. 21, 2003.

BACKGROUND OF THE INVENTION

This invention relates to houses for pets, in particular for cats. Heretofore, houses for pets such as dogs and cats are often made of wood or plastic which are heavy and awkward to ship to customers. In addition, these prior art pet houses are rather expensive and are difficult to clean. Thus, there is a need for a pet house which is lightweight and easy to ship and which is inexpensive enough so as to be disposable so that cleaning is not necessary.

SUMMARY OF THE INVENTION

In accordance with one form of this invention, there is provided a pet house substantially formed from a unitary blank of material. The house is foldable from a collapsed state for shipping and storage to an erect state for use. The house includes a bottom having first, second, third and fourth edges. First and second sidewalls are attached to one another forming an apex at the top of the house. The first side wall is attached to the first edge of the bottom. At least one slot is in the bottom near the second edge. At least one locking tab extends from the second side wall. The locking tab is received in the slot. First and second end walls are provided. The first end wall has an opening therein to permit the pet to enter and exit the house. The first end wall is attached to the third edge of the bottom. The second end wall is attached to the fourth edge of the bottom. The first and second end walls are attached to the first and second side walls, preferably by means of aligned holes and locking clips.

In accordance with another form of this invention, there is provided a method for assembling the pet house described above from a unitary blank of material. The blank is folded where the first end wall is attached to the third edge of the bottom so that the first end wall extends upwardly. The blank is folded where the second end wall is attached to the fourth edge of the bottom so that the second end wall extends upwardly. The blank is folded where the first side wall is attached to the first edge of the bottom so that the first side wall extends upwardly. The blank is folded where the first side wall is attached to the second side wall, wherein an apex is formed at the top of the house. The locking tab is inserted into the slot. The first end wall is attached to the first and second side walls. The second end wall is attached to the first and second side walls.

DESCRIPTION OF THE PREFERRED EMBODIMENT

Figure 1:
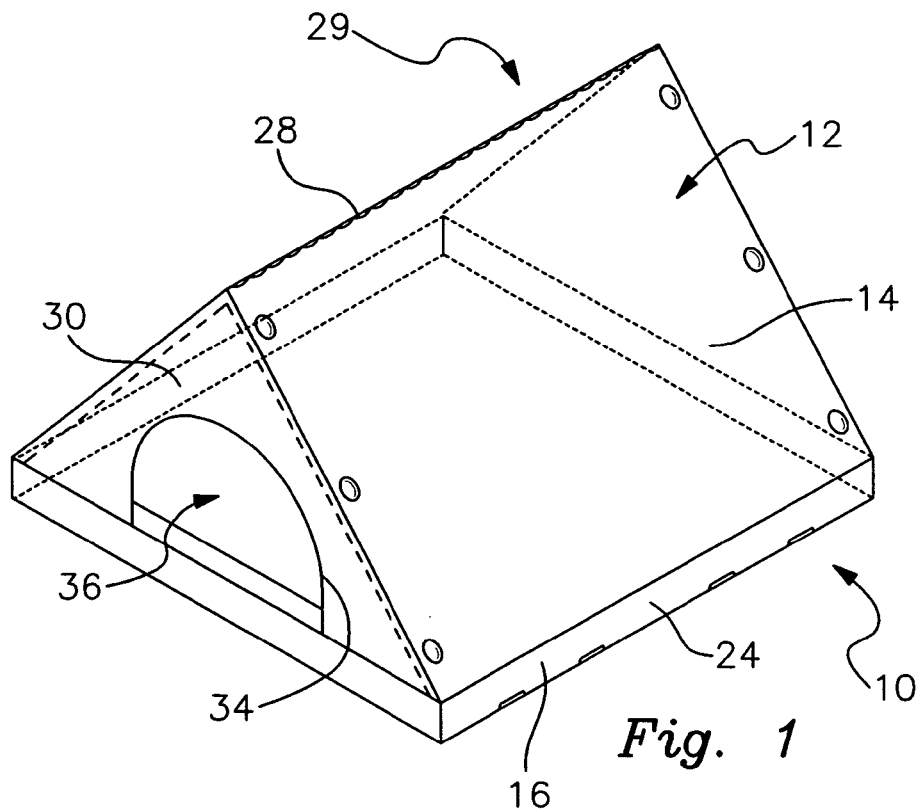
FIG. 1 is a perspective view showing the front and right side of one embodiment of the pet house of the subject invention.
Figure 2:
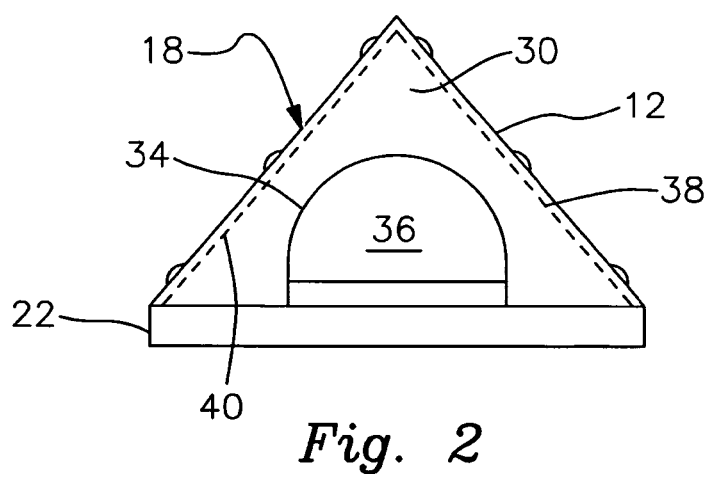
FIG. 2 is a front elevational view of the embodiment of FIG. 1.
Figure 3:
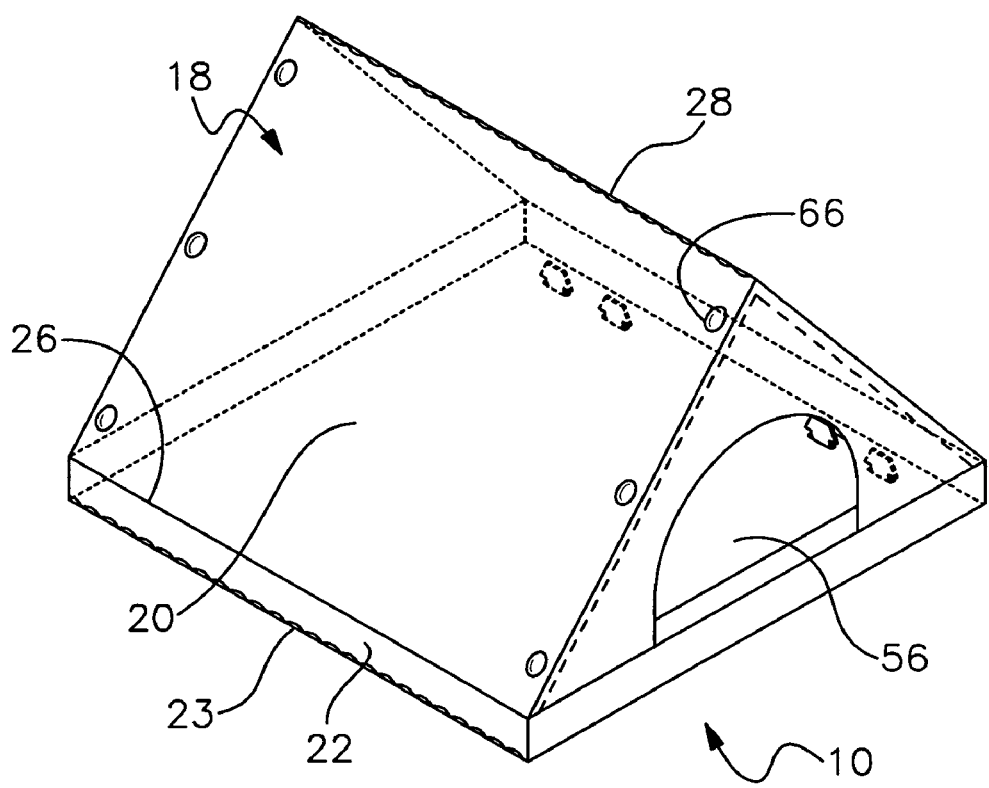
FIG. 3 is a perspective view showing the front and left side of the pet house of the subject invention.
Figure 4:
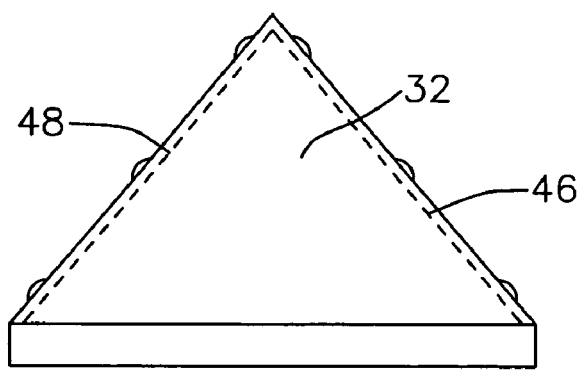
FIG. 4 is a rear elevational view of the embodiment of FIG. 1.
Figure 5:
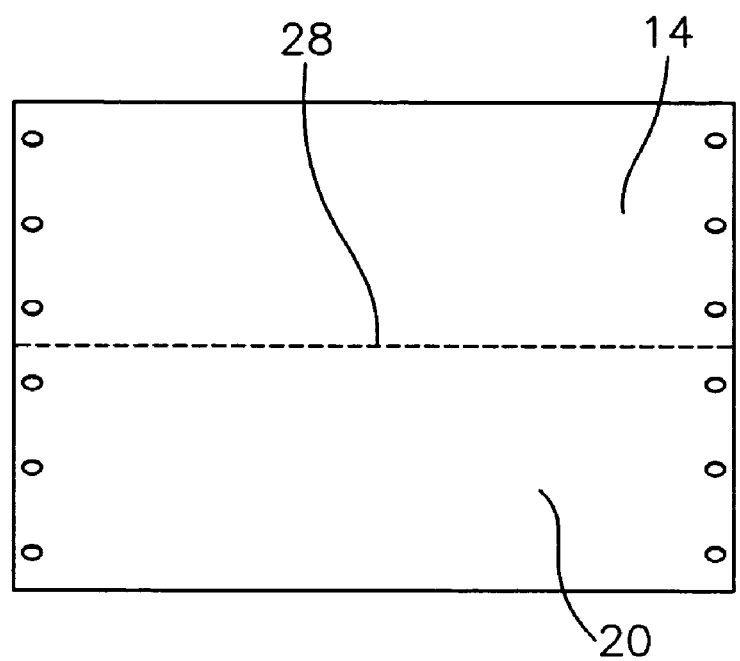
FIG. 5 is a top plan view of the embodiment in FIG. 1.

Referring now more particularly to FIG. 1, there is provided pet house 10 which is in the general shape of a three dimensional isosceles triangle. Preferably, the pet house 10 is made of cardboard so that it is inexpensive, lightweight, and easy to construct from the cut-out form shown in FIG. 10. Pet house 10 includes a right side wall 12 and left side wall 18. Right side wall 12 including sloping section 14 and vertical section 16 and left side wall 18 including sloping section 20 and vertical section 22.

The boundary between right sloping section 14 and vertical section 16 is defined by a weakened score line 24 which enables that portion of right side wall 12 to be readily bent. The boundary between sloping section 20 of left side wall 18 and vertical section 22 is in the form of bend 26. The boundary between the right side wall 12 and left side wall 14 includes weakened score line 28 so that a bend may readily be formed in the transition between the two sloping sections 14 and 20 of walls 12 and 18, resulting in apex 29 of the three dimensional triangle shaped pet house 10.

Figure 10:
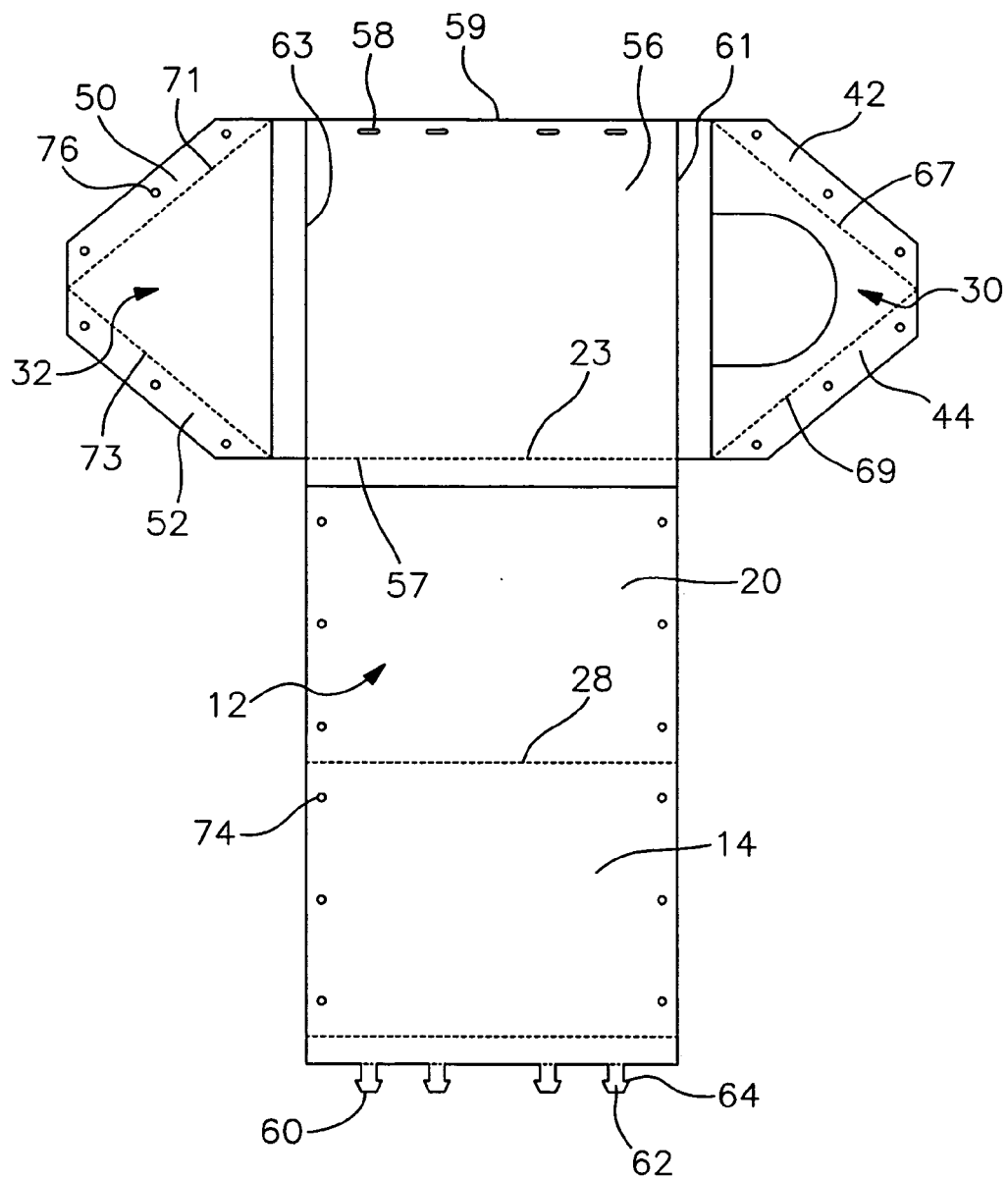
FIG. 10 is a top plan view of the embodiment of FIG. 1, but in the unfolded condition.

Pet house 10 also includes a pair of triangular shaped end walls, namely front wall 30 and rear wall 32. Front wall 30 includes opening 34. Opening 34 permits the pet to enter and exit the hollow interior 36 of pet house 10. Extensions 42 and 44 are attached to front wall 30. Extensions 50 and 52 are attached to rear wall 32. The front wall 30 includes score lines 38 and 40 which permit extensions 42 and 44, which are shown in FIG. 10, to be folded inwardly. Rear wall 32 includes score lines 46 and 48 which enable extensions 50 and 52 to be readily folded inwardly.

Figure 6:
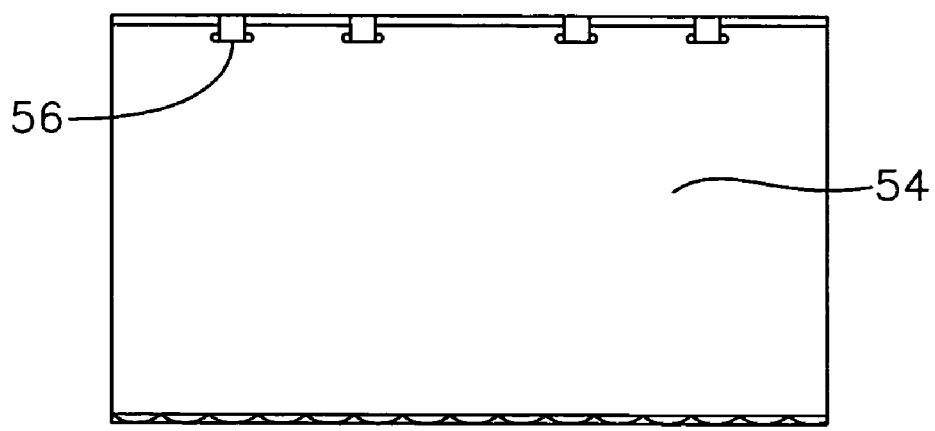
FIG. 6 is a bottom plan view of the embodiment of FIG. 1.
Figure 7:
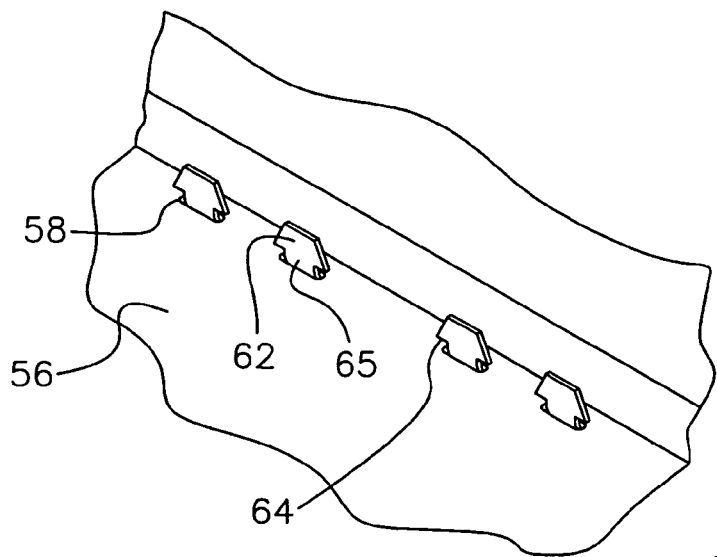
FIG. 7 shows details of the tab and slot connector construction of the embodiment of FIG. 1.
Figure 8:
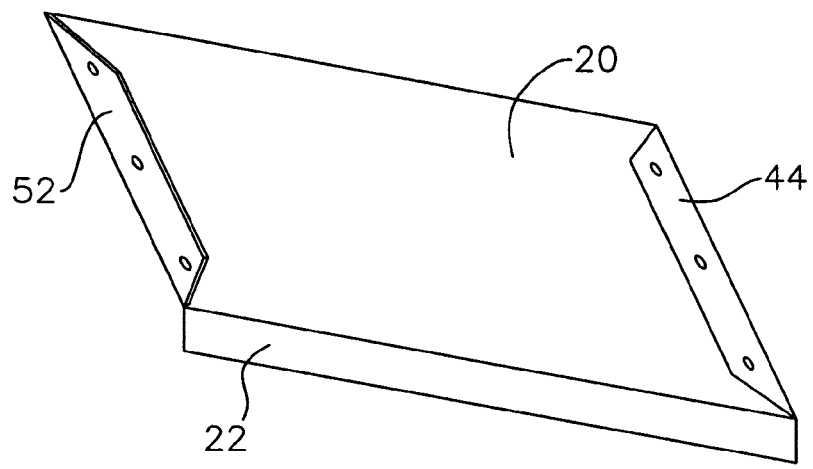
FIG. 8 shows the inside of the right wall interfacing with extensions of the front and rear walls of the embodiment of FIG. 1.

Pet house 10 also includes a bottom 54, as shown in FIG. 6, one side of which forms the floor 56 of pet house 10. The other side 55 of bottom 54 is adapted to contact the floor or the ground. Referring now more particularly to FIG. 10, bottom 54 includes four edges about the outer periphery thereof, namely first edge 57, second edge 59, third edge 61, and fourth edge 63. Side wall 12 is attached to edge 57. Front wall 30 is attached to edge 61 and rear wall 32 is attached to edge 63. Bottom 54 includes four open slots 58 near edge 59. The slots are adapted to receive four locking tabs 60. Each tab 60 includes a head 62 and shaft 65. Head 62 is somewhat wider than the width of the slots so that tab 60 may be press-fitted into slot 58 with shoulders 64 of each head holding the tab in the corresponding slot. The shafts 65 are bent around edge 59 of bottom 54 so that the heads 62 extend into the inside 36 of the house 10. Thus, the side 55 of bottom 54 will remain relatively smooth to enhance the stability of the house 10.

Figure 9:
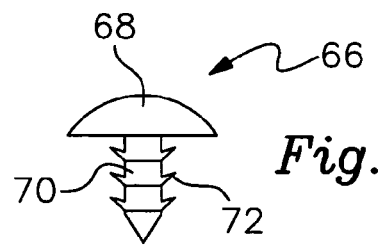
FIG. 9 shows a clip used with the embodiment of FIG. 1.

Along with the tab and slot construction, the pet house is held together by a plurality of clips, such as clip 66, the details of which are shown in FIG. 9. Clip 66 is a commercially available panel fastener, which may be purchased from ITW Fastex. Clip 66 includes head 68 and shank 70. Shank 70 includes a plurality of barb-like rib projections 72.

As shown in FIG. 10, sloping sections 14 and 20 for right and left side walls 12 and 18 and extensions 42, 44, 50 and 52 of front and rear walls 30 and 32 each include a plurality of holes, including holes 74 in side wall 14 and 18 and holes 76 in extensions 42, 44, 50 and 52 for receiving clip 66. Each hole in side walls 14 and 20 align with corresponding hole in extensions 42, 44, 50 or 52, and the shank portion 70 of a clip is received in both holes.

After a cardboard piece has been cut out and scored forming the unitary blank, as shown in FIG. 10, the pet house is assembled as set forth below. Front wall 30 and rear wall 32 are raised vertically. Extensions 42, 44, 50 and 52 are folded inwardly along the score lines 67, 69, 71 and 73 which separate those extensions from the remainder of their respective front and rear walls. Side walls 14 and 20 are raised vertically, rotating about an axis formed by score line 23 along edge 57. Side walls 14 and 20 are folded along score line 28, forming the apex of the roof of the house. The four tabs 60 are inserted into the four slots 58 in bottom 54 extending into the inside 36 of house 10 and are locked in the slots by shoulder 64. Nine clips 66 are pressed into the aligned holes 74 and 76 in the side walls 14 and 20 and extensions 42, 44, 50 and 52 thereby completing the assembly of the pet house.

The outside surfaces of side walls 14 and 20 are adapted to receive various indicia, such as logos and the like.

The floor 56 of pet house 10 is adapted to receive a cushion for the pet, such as a PURR PAD® cushion which is commercially available from K.T. Manufacturing, Inc. of Prosperity, S.C. The PURR PAD® is described in U.S. Pat. No. 5,515,811 which is incorporated herein by reference.

Thus, there is provided a pet house which is inexpensive, light weight and disposable. It is also easy to manufacture and assemble. In addition, it can be readily shipped in its unassembled condition, thereby reducing shipping costs.

From the foregoing description of the preferred embodiment of the invention, it is apparent that many modifications may be made therein. It should be understood, however, that this embodiment of the invention is an exemplification of the invention only and that the invention is not limited thereto. It is to be understood, therefore, that it is intended in the appended claims to cover all modifications as fall within the true spirit and scope of the invention.

What is claimed is:

1. A pet house substantially formed from a unitary blank of material; the house being foldable from a collapsed state for shipping and storage to an erect state for use; said house comprising:

a bottom; said bottom having first, second, third and fourth edges;

first and second side walls integral and continuous with one another forming an apex at the top of said house; said first side wall integral and continuous with said first edge of said bottom;

at least one slot in the surface of said bottom near said second edge;

at least one locking tab extending from said second side wall; said locking tab extending around said second edge of said bottom and received in slot;

first and second triangular end walls; said first end wall having an opening therein to permit the pet to enter and exit said house; said first end wall integral and continuous with said third edge of said bottom; said second end wall integral and continuous with said fourth edge of said bottom; a means for attaching said first end wall to said first and second side walls; a means for attaching said second end wall to said first and second side walls; and first and second extensions integral and continuous said first end wall and third and fourth extensions integral and continuous said second end wall; said first and third extensions being fastened to said first side wall; said second and fourth extensions being fastened to said second side wall.

2. A pet house as set forth in claim 1 further including at least one hole in said first extension; a first hole along one edge of first side wall; said hole in said first extension aligning with said first hole forming first aligned holes; a first clip received in said first aligned holes; at least one hole in said second extension; a second hole along one edge of said second side wall; said hole in said second extension aligning with said second hole forming second aligned holes; a second clip received in said second aligned holes; at least one hole in said third extension; a third hole along another edge of said first side wall; said hole in said third extension aligning with said third hole forming third aligned holes; a third clip received in said third aligned holes; at least one hole in said fourth extension; a fourth hole along another edge of said second side wall; said hole in said fourth extension aligning with said fourth hole forming fourth aligned holes; a fourth clip received in said fourth aligned holes.

3. A pet house as set forth in claim 1 wherein said at least one slot includes a plurality of slots and wherein at least said one locking tab includes a plurality of locking tabs.

4. A pet house as set forth in claim 3 wherein each locking tab includes a shaft and a head; said head extending into the inside of said house.

5. A pet house as set forth in claim 4 wherein each of said shafts extend around said second edge of said bottom.

6. A pet house as set forth in claim 1 wherein each side wall includes a short vertical section and a long section; said long sections, together are substantially in the shape of two legs of a solid isosceles triangle.

\* \* \* \* \*